US012644845B2

(12) United States Patent
Choi

(10) Patent No.: US 12,644,845 B2
(45) Date of Patent: Jun. 2, 2026

(54) STACKING INSPECTION APPARATUS FOR ELECTRODE PLATE OR UNIT CELL

(71) Applicant: LG Energy Solution, Ltd., Seoul (KR)

(72) Inventor: Minjun Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 576 days.

(21) Appl. No.: 17/915,403

(22) PCT Filed: Mar. 7, 2022

(86) PCT No.: PCT/KR2022/003218
§ 371 (c)(1),
(2) Date: Sep. 28, 2022

(87) PCT Pub. No.: WO2022/260245
PCT Pub. Date: Dec. 15, 2022

(65) Prior Publication Data
US 2024/0183789 A1     Jun. 6, 2024

(30) Foreign Application Priority Data

Jun. 9, 2021     (KR) ........................ 10-2021-0074998

(51) Int. Cl.
*G01N 21/88* (2006.01)
*G01B 11/06* (2006.01)
*H01M 10/04* (2006.01)

(52) U.S. Cl.
CPC ......... *G01N 21/8806* (2013.01); *G01B 11/06* (2013.01); *H01M 10/0404* (2013.01); *H01M 10/0413* (2013.01)

(58) Field of Classification Search
CPC ......... H01M 10/0404; H01M 10/0413; H01M 10/04; H01M 10/0585; H01M 10/0436;
(Continued)

(56) References Cited

U.S. PATENT DOCUMENTS

| | | | |
|---|---|---|---|
| 2014/0027643 A1 | 1/2014 | Aramaki et al. | |
| 2017/0348909 A1* | 12/2017 | Clark | B29C 64/40 |
| 2019/0341658 A1* | 11/2019 | Han | H01M 10/052 |

FOREIGN PATENT DOCUMENTS

| | | |
|---|---|---|
| CN | 106586138 A | 4/2017 |
| CN | 207595135 U | 7/2018 |
| (Continued) | | |

OTHER PUBLICATIONS

English—KR-20190051624-A (Year: 2019).*
(Continued)

*Primary Examiner* — Sumati Lefkowitz
*Assistant Examiner* — Aaron Joseph Sorrin
(74) *Attorney, Agent, or Firm* — Lerner David LLP

(57) ABSTRACT

A stacking inspection apparatus includes: camera units that generate an aligned image by photographing four corner points of the outer periphery of the electrode plates or the unit cells at an upper part in a stacking direction of the electrode plates or the unit cells; and light irradiation units that irradiate light signals to four corner of the inspection object, and sensors that recognize the light signal irradiated from the light irradiation units and determine whether or not alignment of the first electrode plate and the second electrode plate is defective.

7 Claims, 4 Drawing Sheets

(58) Field of Classification Search
CPC ........... H01M 10/0459; H01M 10/125; H01M
10/482; H01M 4/04; G01B 11/06; G01B
11/0608; G01B 11/26
See application file for complete search history.

(56) References Cited

FOREIGN PATENT DOCUMENTS

| | | | | | |
|---|---|---|---|---|---|
| CN | 110861911 | A | | 3/2020 | |
| CN | 112660686 | A | | 4/2021 | |
| EP | 3754772 | A1 | * | 12/2020 | ........ H01M 10/0404 |
| EP | 3826090 | A1 | | 5/2021 | |
| JP | 6022177 | B2 | | 11/2016 | |
| JP | 6344122 | B2 | | 6/2018 | |
| JP | 6402308 | B2 | | 10/2018 | |
| JP | 2019152507 | A | | 9/2019 | |
| JP | 6589663 | B2 | | 10/2019 | |
| KR | 20170103341 | A | | 9/2017 | |
| KR | 20190020147 | A | | 2/2019 | |
| KR | 20190051624 | A | * | 5/2019 | |
| KR | 102107226 | B1 | | 5/2020 | |
| KR | 20200059838 | A | * | 5/2020 | |
| KR | 20200077382 | A | | 6/2020 | |
| KR | 102130027 | B1 | | 7/2020 | |
| KR | 20200088222 | A | | 7/2020 | |
| KR | 102251319 | B1 | | 5/2021 | |

OTHER PUBLICATIONS

International Search Report for Application No. PCT/KR2022/003218 mailed Jul. 4, 2022, pp. 1-3. [See p. 2, categorizing the cited references].
Extended European Search Report including Written Opinion for Application No. 22758110.5, dated Aug. 4, 2023, pp. 1-8.

* cited by examiner

FIG. 4

STACKING INSPECTION APPARATUS FOR ELECTRODE PLATE OR UNIT CELL

CROSS REFERENCE TO RELATED APPLICATIONS

The present application is a national phase entry under 35 U.S.C. § 371 of the International Application No. PCT/KR2022/003218 filed on Mar. 7, 2022, which claims the priority from Korean Patent Application No. 10-2021-0074998 filed on Jun. 9, 2021, the disclosures of which are incorporated herein by reference in their entireties.

FIELD OF THE INVENTION

The present disclosure relates to a stacking inspection apparatus for electrode plates or unit cells.

BACKGROUND OF THE INVENTION

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

In recent years, as mobile devices, such as portable computers, portable phones, and cameras, have been increasingly developed, the demand for secondary batteries has also sharply increased as an energy source for the mobile devices. Among such secondary batteries is a lithium secondary battery exhibiting high charge/discharge characteristics and lifetime characteristics and being environmentally friendly, in which much research has been carried out and which is now commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

Such a lithium secondary battery is manufactured by forming an electrode assembly through a stacking process of a cathode and an anode, and incorporating the electrode assembly in a secondary battery case together with an electrolytic solution.

At this time, the stacking process of the cathode and the anode is performed in various ways. The stacking is performed in the form of simply interposing a separator between the cathode and the anode, or is performed by manufacturing mono-cell containing a cathode and a separator or an anode and a separator, bi-cell containing a cathode, an anode and a separator, with electrodes of the same polarity being arranged on the outermost shell on both sides, or full-cell containing a cathode, an anode and a separator, with electrodes of different polarities being arranged in the outermost shell on both sides, folding or stacking them, followed by lamination.

In this case, such a stacking process is one of the processes that can affect the performance of the secondary battery in the future, wherein the cathode and the anode must be aligned and stacked in a symmetrical state without twisting up, down, left and right.

First, even in any case, when a cathode and an anode are stacked, twisting up, down, left and right between the cathode and the anode may occur, and thus, stacking alignment of the cathode and the anode itself is required. In addition, stacking alignment is also required during folding of unit cells, such as mono-cell, bi-cell, and full-cell, including electrodes and separators, and during stacking between these unit cells in the stacking process.

Particularly, since the folding process of the unit cells winds the unit cells placed on the separator, it can be excellent in terms of process speed, but problems such as the tab interval of each electrode and twisting up, down, left and right are frequently occurred. This can be a major factor affecting the life and safety testing in the future because the interval between the cathode and the anode can be reversed.

In order to improve these points, attempts have been made to improve ACOH by advancing the process of stacking and crimping unit cells, but when the number of stacked unit cells increases, there is a limit to the alignment of the unit cells inside and outside the electrode assembly. Thus, when adjusting the production conditions, there is a problem that a large number of unit cells are expressed as loss, which causes a problem of lowering the yield.

Therefore, there is an urgent need to develop a technique that can solve the above problems and eliminate stacking alignment defects due to twisting up, down, left and right when stacking electrodes and unit cells, thereby enabling improvement of the quality and yield.

BRIEF SUMMARY OF THE INVENTION

The present disclosure has been designed to solve the above-mentioned problems and other technical problems that have yet to be resolved.

Specifically, it is an object of the present disclosure to provide a stacking inspection apparatus that enables improvement of the product quality and the yield by determining stacking alignment defects in real time without major equipment changes in the existing process.

It is another object of the present disclosure to provide a stacking inspection apparatus that can measure the vertical thickness difference based on the tab formation direction of the electrodes or unit cells through the stacking testing apparatus, minimize the error caused when an operator manually measures the thickness difference, thereby enabling further improvement of the product quality.

In order to achieve the above objects, according to one embodiment of the present disclosure, there is provided a stacking inspection apparatus for electrode plates when a first electrode plate and a second electrode plate are stacked so that a separator is interposed between the first electrode plate and the second electrode plate, the apparatus comprising:

camera units that generate an aligned image by photographing four corner points of the outer periphery of the first electrode plate or the second electrode plate at an upper part in a stacking direction of the first electrode plate and the second electrode plate; and light irradiation units that irradiate a light signal to four corner points of the first electrode plate and the second electrode plate as inspection objects at the upper part of the first electrode plate or the second electrode plate when the first electrode plate and the second electrode plate are stacked, wherein the camera units comprises sensors that recognize the light signal irradiated from the light irradiation units and determine whether or not alignment of the first electrode plate and the second electrode plate is defective.

In this case, the light irradiation units may irradiate the light signal so that the light signal passes when the first electrode plate or the second electrode plate is partially deviated even in any of left/right/upper/lower directions at the position where the first electrode plate or the second electrode plate should be stacked.

And, the sensors recognize the light signal irradiated from the light irradiation units, and may determine to be alignment defects when at least one light signal passes through the four corner points.

Further, the sensors may measure the reciprocating time of the light signal irradiated from the light irradiation units.

Moreover, the stacking inspection apparatus may further include a measuring unit that measures the thickness according to the position of each of the first electrode plate or the second electrode plate from the reciprocating time of each light signal measured from the sensors.

Furthermore, the stacking inspection apparatus may further include a control unit that corrects the alignment value according to information received from the sensors and instructs the correction of the stacking position of the first electrode plate or the second electrode plate when the sensors determine to be alignment defects, and determines to be defective when the reciprocating time difference of each light signal measured from the sensors is equal to or greater than a certain value, or when the thickness deviation depending on the position of each of the first electrode plate or the second electrode plate measured from the measurement unit is equal to or greater than a certain value.

According to another embodiment of the present disclosure, there is provided a stacking inspection apparatus for unit cells when the unit cells are stacked so that a separation film or a separator is interposed between one or more unit cells, the apparatus comprising:

camera units that generate an aligned image by photographing four corner points of the outer periphery of the unit cells at an upper part in a stacking direction of the unit cells; and light irradiation units that irradiate a light signal to four corner points of the unit cells as inspection objects at the upper part of the unit cells when the unit cells are stacked, wherein the camera units comprises sensors that recognize the light signal irradiated from the light irradiation units and determine whether or not alignment of the unit cells is defective.

That is, not only the alignment of the electrode plates but also the alignment of the unit cells can be inspected.

In this case, the light irradiation units may irradiate the light signal so that the light signal passes when the unit cells are partially deviated even in any of left/right/upper/lower directions at the position where the unit cells should be stacked, and the sensors recognize the light signal irradiated from the light irradiation units, and may determine to be alignment defects when at least one light signal passes through the four corner points.

Further, the sensors may measure the reciprocating time of the light signal irradiated from the light irradiation units, and the stacking inspection apparatus may further include a measuring unit that measures the thickness according to the position of each of the unit cells from the reciprocating time of each light signal measured from the sensor.

Moreover, the stacking inspection apparatus may further include a control unit that corrects the alignment value according to information received from the sensors and instructs the correction of the stacking position of the unit cells when the sensors have determined to be alignment defects, and determines to be defective when the reciprocating time difference of each light signal measured from the sensors is equal to or greater than a certain value, or when the thickness deviation depending on the position of each of the unit cells measured from the measurement unit is equal to or greater than a certain value.

The unit cells to which such a stacking inspection apparatus is applied may be stacked in such a manner that the separation film winds the unit cells in one direction, or may be stacked in such a manner that the separation film folds the unit cells in a zigzag, or may be stacked in such a manner that the separator is interposed between the unit cells and laminated.

BRIEF DESCRIPTION OF THE DRAWINGS

FIG. 4 is a schematic diagram showing a side view of a stacking inspection apparatus according to another embodiment of the present disclosure.

DETAILED DESCRIPTION

Hereinafter, the present disclosure will be described in more detail for a better understanding of the present disclosure.

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

The technical terms provided herein is merely used for the purpose of describing particular embodiments only, and is not intended to be limiting of the present disclosure. The singular forms include the plural forms as well, unless the context clearly indicates otherwise.

The term "including" or "comprising" as used herein specifies a specific feature, integer, step, action, component or a combination thereof, but does not exclude the presence or addition of a different specific feature, integer, step, component and/or a combination thereof.

According to one embodiment of the present disclosure, there is provided a stacking inspection apparatus for electrode plates when a first electrode plate and a second electrode plate are stacked so that a separator is interposed between the first electrode plate and the second electrode plate, the apparatus comprising:

camera units that generate an aligned image by photographing four corner points of the outer periphery of the first electrode plate or the second electrode plate at an upper part in a stacking direction of the first electrode plate and the second electrode plate; and light irradiation units that irradiate a light signal to four corner points of the first electrode plate and the second electrode plate as inspection objects at the upper part of the first electrode plate or the second electrode plate when the first electrode plate and the second electrode plate are stacked, wherein the camera units comprises sensors that recognize the light signal irradiated from the light irradiation units and determine whether or not alignment of the first electrode plate and the second electrode plate is defective.

Now, the present disclosure will be described in detail with reference to FIGS. 1 and 2.

Figure 1:
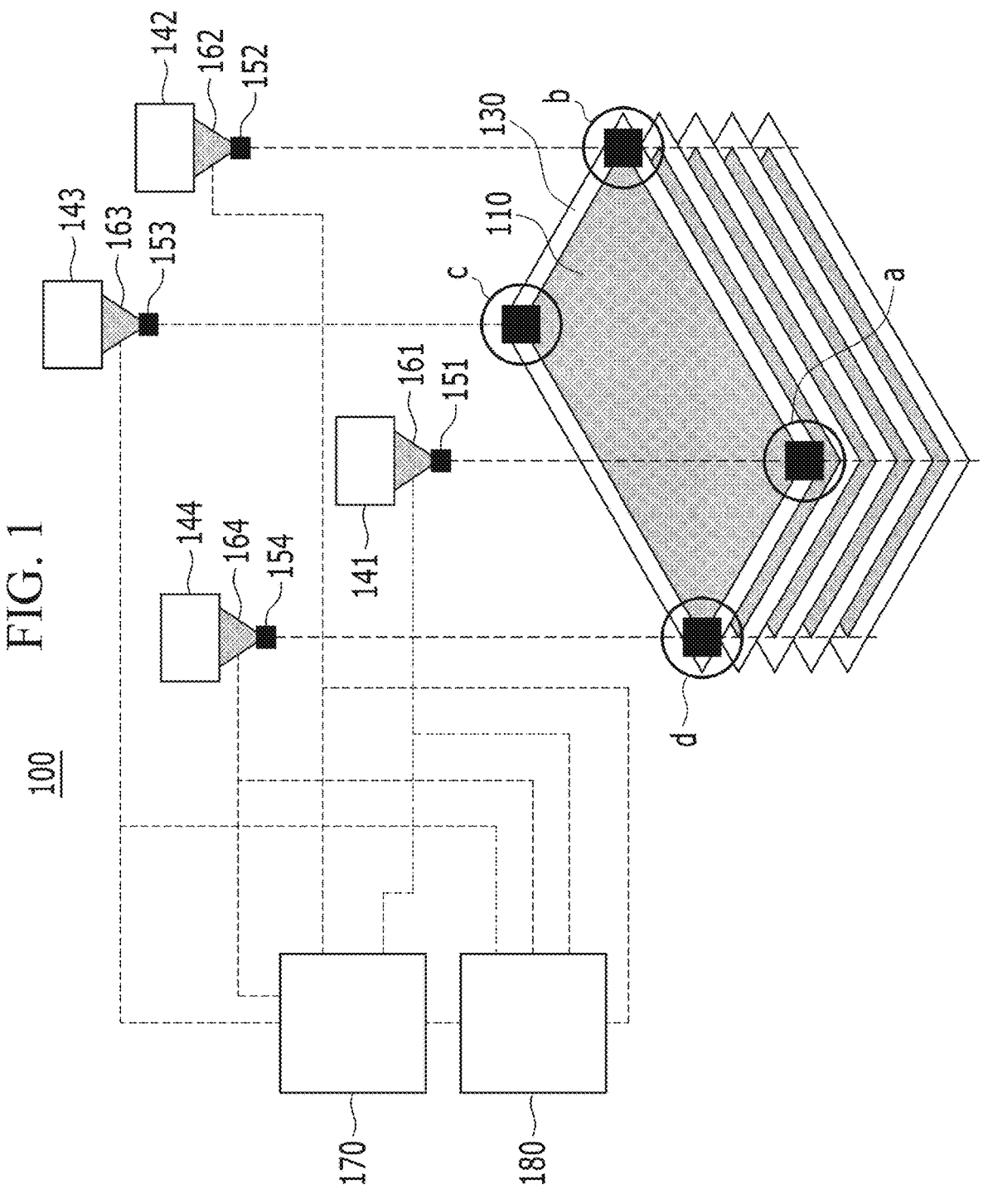
FIG. 1 is a perspective view schematically showing a stacking inspection apparatus according to an embodiment of the present disclosure.
Figure 2:
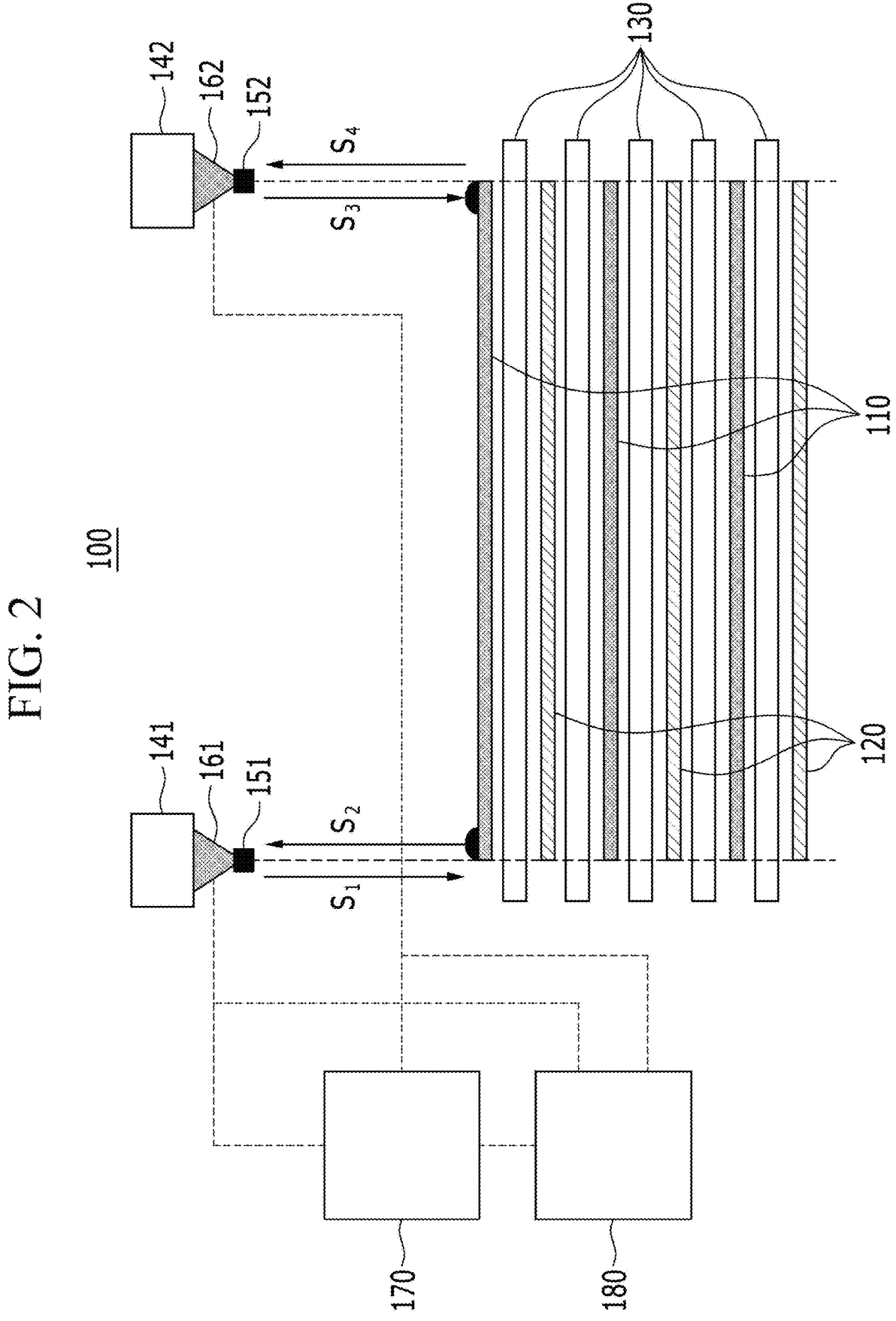
FIG. 2 is a schematic diagram showing a side view of the stacking inspection apparatus of FIG. 1.

FIG. 1 is a perspective view schematically showing a stacking inspection apparatus 100 according to an embodiment of the present disclosure, and FIG. 2 schematically shows a side view of the stacking inspection apparatus 100 of FIG. 1.

Referring to FIGS. 1 and 2 together, the stacking inspection apparatus 100 according to an embodiment of the present disclosure is a stacking inspection apparatus 100 that inspects the alignment state of electrode plates 110 and 120 when the first electrode plate 110 and the second electrode plate 120 are stacked so that a separator 130 is interposed between the first electrode plate 110 and the second electrode plate 120.

The stacking inspection apparatus 100 includes camera units 141, 142, 143 and 144 that generate an aligned image by photographing four corner points a, b, c and d of the outer periphery of the first electrode plate 110 or the second electrode plate 120 at an upper part in a stacking direction of the first electrode plate 110 and the second electrode plate 120; and light irradiation units 151, 152, 153 and 154 that irradiate light signals to four corner points of the first electrode plate 110 and the second electrode plate 120 as inspection objects at the upper part of the first electrode plate 110 or the second electrode plate 120, when the first electrode plate 110 and the second electrode plate 120 are stacked, wherein the camera units 141, 142, 143 and 144 include sensors 161, 162, 163 and 164 that recognize the light signal irradiated from the light irradiation units 151, 152, 153 and 154 and determine whether alignment of the first electrode plate 110 and the second electrode plate 120 is defective.

At this time, the light irradiation units 151, 152, 153 and 154 irradiate the light signal so that the light signal passes when the first electrode plate 110 or the second electrode plate 120 is partially deviated even in any of left/right/upper/lower directions at the position where the plates should be stacked.

In FIGS. 1 and 2, the light signal is irradiated so as not to deviate from the corners of the electrode plates 110 and 120. Therefore, when the electrode plates 110 and 120 are properly stacked, the light signal is covered by the outermost electrode plate. However, if they are stacked so that even part of the upper, lower, left, and right are deviated, the light signal passes through without being covered by the outermost electrode plate, and the light signal appears on the lower electrode plate. In this case, the sensors 161, 162, 163 and 164 recognize the light signal irradiated from the light irradiation units 151, 152, 153 and 154, and if at least one of the four corner points a, b, c and d recognizes that the light signal passes, it is determined to be alignment defects.

At this time, the sensors 161, 162, 163 and 164 may inform an operator of this visually or audibly.

The stacking inspection apparatus 100 of the present disclosure may further include a control unit 180 that corrects the alignment value according to information received from the sensors 161, 162, 163 and 164 and instructs the correction of the stacking position of the first electrode plate 110 or the second electrode plate 120 when the sensors 161, 162, 163 and 164 determine to be alignment defects.

That is, since the alignment correction can be automated by the control unit 180, the alignment correction can be performed in real time.

Therefore, according to the present disclosure, since it is possible to determine in real time whether or not the electrode plates 110 and 120 are aligned each time they are stacked, it is possible to produce a product that is more aligned than before. Further, since the time required for the cathode-anode interval inspection performed at the time of product production in the past can be shortened, the product quality and yield can be improved.

Meanwhile, the sensors 161, 162, 163 and 164 can further measure the reciprocating time of the light signal irradiated from the light irradiation units 151, 152, 153, and 154. That is, the sensors 161, 162, 163, and 164 can measure the time when the light signal is recognized again from the time when the light signal is irradiated in connection with the light irradiation units 151, 152, 153 and 154, and the time (S1+S2, S3+S4) when the light signal starts from the light irradiation units 151, 152, 153 and 154, reaches the electrode plate 110, and is recognized by the sensors 161, 162, 163, and 164 again, as shown in FIG. 2.

In this case, a difference may occur between the four corner points a, b, c and d until the light signal is recognized again, from which the thickness at each position of the electrode plates can be estimated.

Alternatively, the stacking inspection apparat 100 may further include a measuring unit 170 that measures the thickness according to the position of each of the first electrode plate 110 or the second electrode plate 130 from the reciprocating time (S1+S2, S3+S3) of each light signal measured from the sensors 161, 162, 163 and 164.

Specifically, the measurement unit 170 stores information about the distance between the light irradiation units 151, 152, 153 and 154 for each stacking and the electrode plate located at the outermost shell at each stacking, and calculates the interval after the new electrode plate is stacked from the reciprocating time of the light signal, whereby the thickness of the newly stacked electrode plate can be measured from [the distance between the outermost electrode plate and the light irradiation units 151, 152, 153 and 154 before stacking—the distance between the outermost electrode plate and the light irradiation units 151, 152, 153 and 154 after stacking new electrode plates].

Meanwhile, the control unit 180 described above can determine to be defective when the reciprocating time difference (|S1+S2−(S3+S4)|) of each light signal measured from the sensors 161, 162, 163 and 164 is equal to or greater than a certain value, or when the thickness deviation depending on the position of each of the first electrode plate 110 or the second electrode plate 120 measured from the measurement unit 170 is equal to or greater than a certain value.

Therefore, as described above, when measuring the thickness at each position of the electrode plates, not only alignment defects, but also the loading deviation within one electrode plate, which appears due to the actual coating process characteristics can be measured in real time. Further, electrode plates with a large loading deviation depending on the position can be determined to be defective and can be removed in real time, thereby improving the product quality. In addition, conventionally, there has been a problem that an error occurs between workers when the worker measures the thickness of the electrode plate. However, by automating and mechanizing them, a product determined to be a uniform standard can be obtained, and thus, the reliability can be increased.

According to another embodiment of the present disclosure, there is provided a stacking inspection apparatus for unit cells when the unit cells are stacked so that a separation film or a separator is interposed between one or more unit cells, the apparatus comprising:

camera units that generate an aligned image by photographing four corner points of the outer periphery of the unit cells at an upper part in a stacking direction of the unit cells; and light irradiation units that irradiate a light signal to four corner points of the unit cells as inspection objects at the upper part of the unit cells, wherein the camera units comprises sensors that recognize the light signal irradiated from the light irradiation units and determine whether or not alignment of the unit cells is defective.

Figure 3:
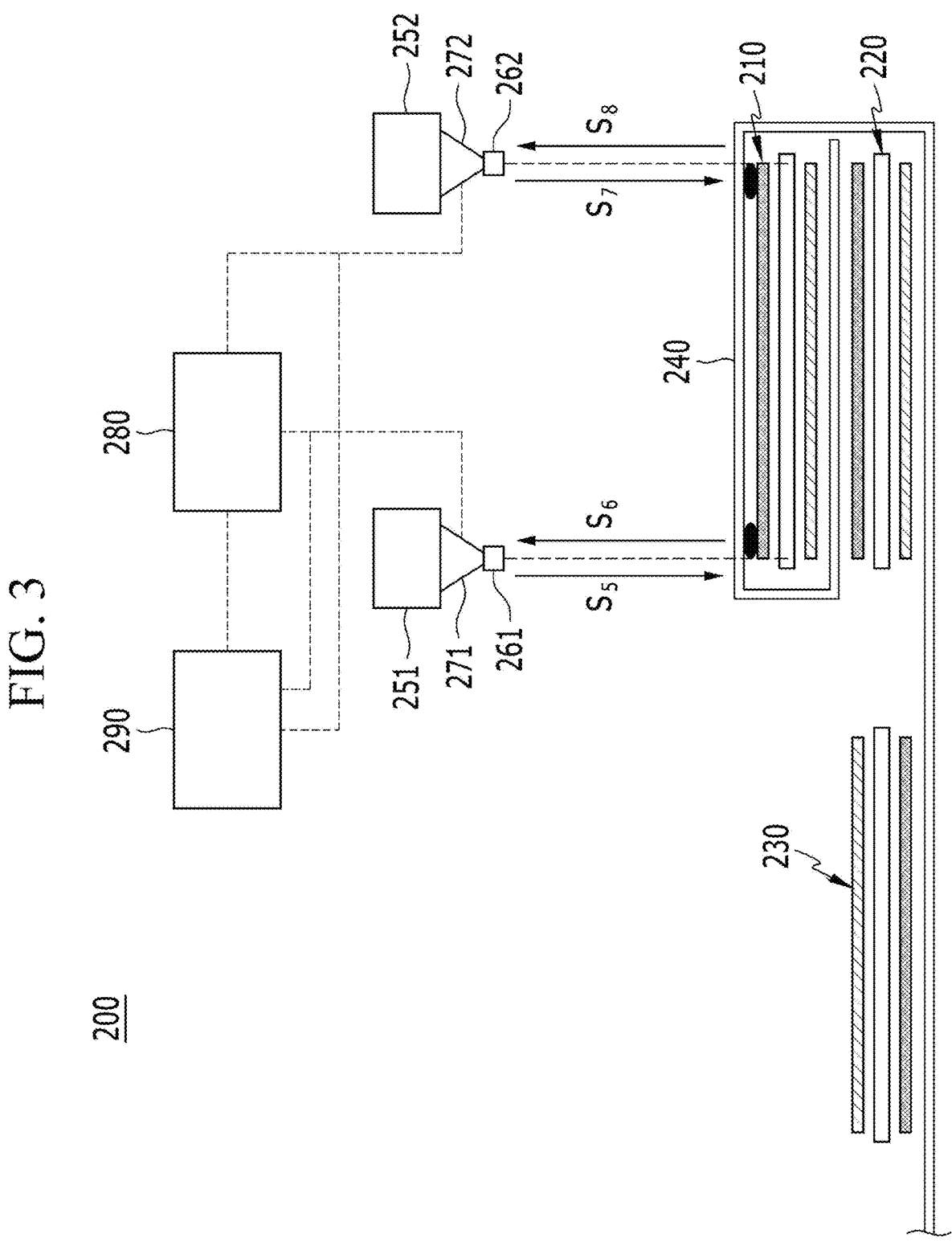
FIG. 3 is a schematic diagram showing a side view of a stacking inspection apparatus according to another embodiment of the present disclosure.
Figure 4:
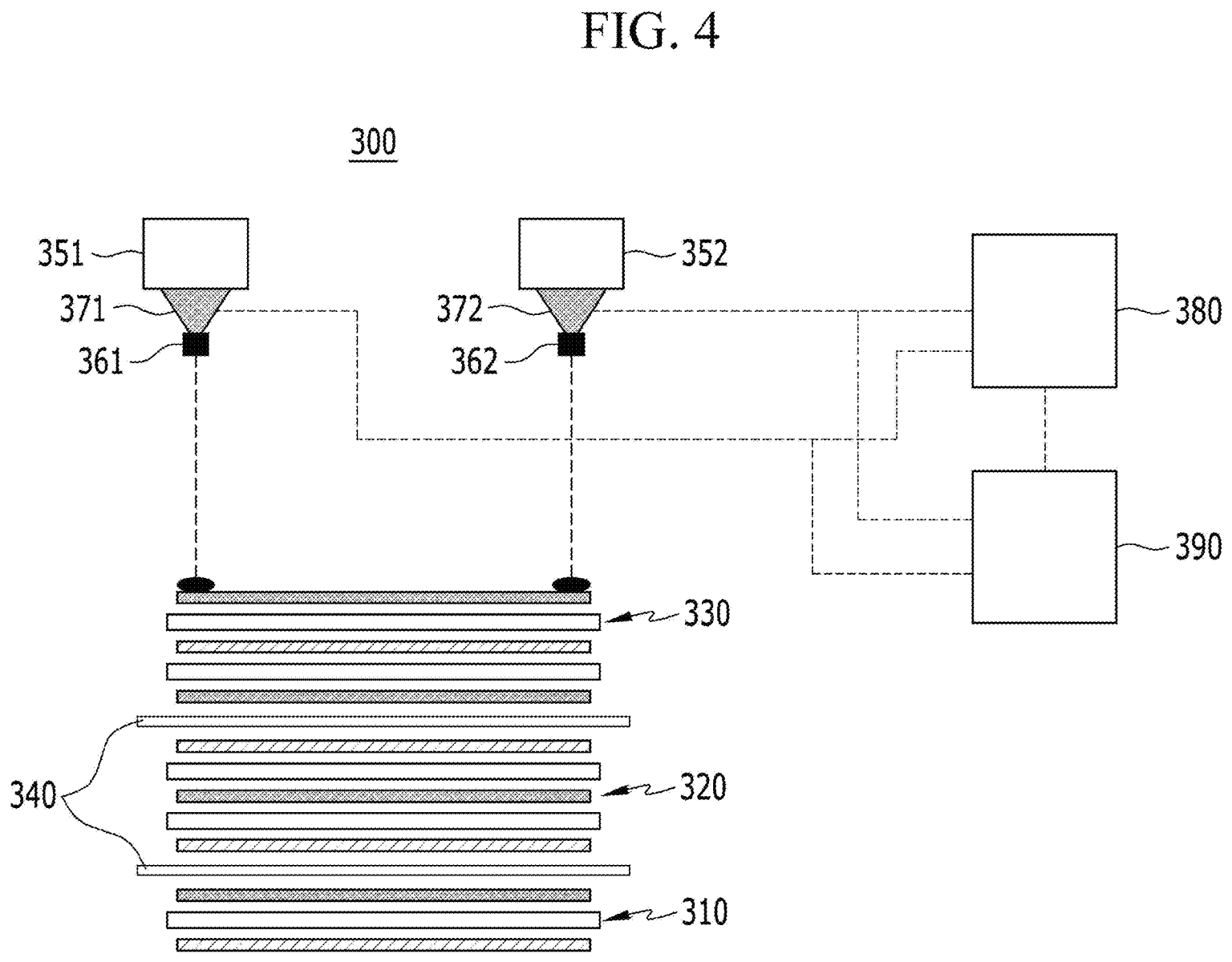

FIGS. 3 and 4 schematically show side views of the stacking inspection apparatuses 200 and 300 for such unit cells.

First, referring to FIG. 3, the unit cells 210, 220 and 230 are stacked in the form of winding in one direction such that a separation film 240 is interposed between the one or more unit cells 210, 220 and 230, thereby manufacturing an electrode assembly.

At this time, the stacking inspection apparatus 200 according to the present invention includes camera units 251 and 252 that generate an aligned image by photographing four corner points as shown in FIG. 1 at an upper part in a stacking direction of the unit cells 210, 220 and 230; and light irradiation units 261 and 262 that irradiate a light signal to four corner points of the unit cells 210, 220 and 230 as inspection objects at the upper part of the unit cells 210, 220 and 230 when the unit cells 210, 220 and 230 are stacked, wherein the camera units 251 and 252 includes sensors 271 and 272 that recognize the light signal irradiated from the light irradiation units 261 and 262 and determine whether or not alignment of the unit cells 210, 220 and 230 is defective.

The sensors 271 and 272 recognize the light signal irradiated from the light irradiation units 261 and 262 and determine to be alignment defects when at least one light signal passes through the four corner points.

At this time, the roles of the camera units 251 and 252, the light irradiation units 261 and 262, and the respective sensors 271 and 272 are the same as described in FIGS. 1 and 2, and the difference is that the inspection objects are the unit cells 210, 220 and 230 rather than the electrode plates.

Further, the same applies to the measurement of the reciprocating time of the light signal irradiated from the light irradiation units 261 and 262 by the sensors 271 and 272. In this case, the stacking inspection apparatus may further include a measuring unit 280 that measures the thickness according to the position of each of the unit cells 210, 220 and 230 from the reciprocating time of each light signal measured from the sensors 271 and 272.

Further, the stacking inspection apparatus may further include a control unit 290 that corrects the alignment value according to information received from the sensors 271 and 272 and instructs the correction of the stacking position of the unit cells 210, 220 and 230 when the sensors 271 and 272 have determined to be alignment defects, and determines to be defective when the reciprocating time difference of each light signal measured from the sensors 271 and 272 is equal to or greater than a certain value, or when the thickness deviation depending on the position of each of the unit cells 210, 220 and 230 measured from the measurement unit 280 is equal to or greater than a certain value.

In this case, the thickness is different from that of the stacking inspection apparatus 100 of FIG. 1 in that the thickness of the unit cells 210, 220 and 230 is measured.

Currently, in the electrode assembly manufacturing apparatus, there is no apparatus capable of filtering out defects in the thickness part after manufacture of the unit cells and stacking or lamination process of the unit cells, and thus, there is a risk of incorporation of products with high thickness. According to the present disclosure, since the thickness of the unit cells 210, 220 and 230 can also be measured, thereby preventing the above problems.

FIG. 2 shows only a format in which the unit cells 210, 220 and 230 are wound in one direction, but it goes without saying that the stacking inspection apparatus 200 according to the present disclosure can be applied even when the separation film is stacked in a form in which unit cells are folded in a zigzag manner.

Additionally, referring to FIG. 4, an electrode assembly is manufactured in such a manner that a separator 340 is stacked in a form of interposing and stacking between one or more unit cells 310, 320 and 330.

At this time, the stacking inspection apparatus 300 according to the present disclosure may further include camera units 351 and 352 that generate an aligned image by photographing four corner points of the outer periphery as shown in FIG. 1 at an upper part in a stacking direction of the unit cells 310, 320 and 330; and light irradiation units 361 and 362 that irradiate a light signal to four corner points of the unit cells 310, 320 and 330 as inspection objects at the upper part of the unit cells 310, 320 and 330 when the unit cells 310, 320 and 330 are stacked, wherein the camera units 351 and 352 includes sensors 371 and 372 that recognizes the light signal irradiated from the light irradiation units 361 and 362 and determines whether or not alignment of the unit cells 310, 320 and 330 is defective.

The sensors 371 and 372 can measure the reciprocating time of the light signal irradiated from the light irradiation units 361 and 362, and the stacking inspection apparatus 300 may further include a measuring unit 380 that measures the thickness according to the position of each of the unit cells 310, 320 and 330 from the reciprocating time of each light signal measured from the sensors 371 and 372.

The stacking inspection apparatus may further include a control unit 390 that corrects the alignment value according to information received from the sensors 371 and 372 and instructs the correction of the stacking position of the unit cells 310, 320 and 330 when the sensors 371 and 372 have determined to be alignment defects, and determines to be defective when the reciprocating time difference of each light signal measured from the sensors 371 and 372 is equal to or greater than a certain value, or when the thickness deviation depending on the position of each of the unit cells 310, 320 and 330 measured from the measurement unit 380 is equal to or greater than a certain value.

Those of ordinary skill in the art will be able to make various applications and modifications within the scope of the present disclosure based on the above contents.

DESCRIPTION OF REFERENCE NUMERALS

100, 200, 300: stacking inspection apparatus,
110: first electrode plate,

9

120: second electrode plate,
130, 340: separator,
210, 220, 230, 310, 320, 330: unit cell,
240: separation film,
141, 142, 143, 144, 251, 252, 351, 352: camera unit;
151, 152, 153, 154, 261, 262, 361, 362: light irradiation
    unit;
161, 162, 163, 164, 271, 272, 371, 372: sensor,
170, 280, 380: measuring unit;
180, 290, 390: control unit.

INDUSTRIAL APPLICABILITY

As described above, the stacking inspection apparatus according to an embodiment of the present disclosure can inspect the stacking alignment defects of the electrode plates or the unit cells in real time by adding a light irradiation unit for irradiating a light signal to the apparatus used in the existing process, and adding a sensor to a camera.

Therefore, without affecting the existing process flow, the time required for alignment inspection or interval inspection between cathode and anode during production can be reduced, and alignment defects can also be drastically reduced, so that the product performance can be enhanced, thus improving the product quality and improving the yield.

In addition, since the thickness difference at each position of the electrode plates or unit cells can be measured through the light irradiation unit used in the stacking inspection apparatus, it is possible to detect a loading defect, etc. with a large thickness deviation at each position. Therefore, it is possible to minimize errors that appear when an operator directly measures it, and it is possible to detect and remove electrode plates or unit cells having loading defects or thickness defects in advance, thus further improving the product quality.

The invention claimed is:

1. A stacking inspection apparatus for electrode plates wherein a first electrode plate and a second electrode plate are stacked in a stack so that a separator is interposed between the first electrode plate and the second electrode plate, the apparatus comprising:
    a plurality of camera units configured to generate an aligned image by photographing four corner points of an outer periphery of the first electrode plate or the second electrode plate at a top of the stack in a stacking direction of the first electrode plate and the second electrode plate; and
    light irradiation units each configured to irradiate a light signal to a corresponding one of the four corner points of the outer periphery of the first electrode plate or the second electrode plate as inspection objects at the top of the stack of the first electrode plate or the second electrode plate when the first electrode plate and the second electrode plate are stacked,
    wherein the camera units comprises sensors configured to recognize the light signals irradiated from the light irradiation units and to determine whether or not alignment of the first electrode plate and the second electrode plate is defective,
    wherein the sensors are configured to measure a reciprocating time of each of the light signals irradiated from the corresponding light irradiation units,
    wherein the stacking inspection apparatus further comprises a measuring unit configured to measure a thickness according to a position of each of the first electrode plate and the second electrode plate from each of the reciprocating times of each light signal measured from the sensors, and
    wherein the stacking inspection apparatus further comprises a control unit configured to correct the alignment according to information received from the sensors and to instruct a correction of a stacking position of the first electrode plate or the second electrode plate when the sensors determine alignment defects, and to determine a defective alignment when a difference between at least two of the reciprocating times of the light signals measured from the sensors is equal to or greater than a first certain value, or when a deviation between at least two of the thicknesses depending on the position of each of the first electrode plate and the second electrode plate measured from the measurement unit is equal to or greater than a second certain value.

2. The stacking inspection apparatus of claim 1, wherein:
each of the light irradiation units is configured to irradiate the light signal so that at least one of the light signals is configured to pass to an adjacent lower electrode plate when a topmost of the first electrode plate or the second electrode plate is partially deviated in any of left, right, upper, or lower directions from a position where the first and second electrodes plates should be stacked.

3. The stacking inspection apparatus of claim 1, wherein:
the sensors are configured to recognize the light signals irradiated from the light irradiation units, and to determine the alignment defect when at least one light signal of the light signals passes through a corresponding one of the four corner points of a topmost electrode plate to an adjacent lower electrode plate.

4. A stacking inspection apparatus for unit cells wherein the unit cells are stacked in a stack so that a separation film or a separator is interposed between one or more unit cells, the apparatus comprising:
    camera units configured to generate an aligned image by photographing four corner points of an outer periphery of the unit cells at a top of the stack in a stacking direction of the unit cells; and
    light irradiation units each configured to irradiate a light signal to a corresponding one of the four corner points of the outer periphery of the unit cells as inspection objects at the top of the stack of the unit cells when the unit cells are stacked,
    wherein the camera units comprises sensors configured to recognize the light signals irradiated from the light irradiation units and to determine whether or not alignment of the unit cells is defective,
    wherein the sensors are configured to measure a reciprocating time of each of the light signals irradiated from the corresponding light irradiation units,
    wherein the stacking inspection apparatus further comprises a measuring unit configured to measure a thickness according to a position of each of the unit cells from each of the reciprocating times of each light signal measured from the sensors, and
    wherein the stacking inspection apparatus further comprises a control unit configured to correct the alignment according to information received from the sensors and to instruct a correction of a stacking position of the unit cells when the sensors have determined alignment defects, and to determine defective alignment when a difference between at least two of the reciprocating times of the light signals measured from the sensors is equal to or greater than a first certain value, or when a deviation between at least two of the thicknesses depending on the position of each of the unit cells measured from the measurement unit is equal to or greater than a second certain value.

5. The stacking inspection apparatus of claim 4, wherein: each of the light irradiation units is configured to irradiate the light signal so that at least one of the light signals is configured to pass to an adjacent lower unit cell when a topmost one of the unit cells is partially deviated even in any of left, right, upper, or lower directions from a position where the unit cells should be stacked.

6. The stacking inspection apparatus of claim 4, wherein: the sensors are configured to recognize the light signals irradiated from the light irradiation units, and to determine the alignment defect when at least one light signal of the light signals passes through a corresponding one of the four corner points of a topmost unit cell to an adjacent lower unit cell.

7. The stacking inspection apparatus of claim 4, wherein: the unit cells are stacked in such a manner that the separation film winds the unit cells in one direction, or are stacked in such a manner that the separation film folds the unit cells in a zigzag, or are stacked in such a manner that the separator is interposed between the unit cells and laminated.

* * * * *